US012345076B2

(12) United States Patent
Birch (10) Patent No.: US 12,345,076 B2
(45) Date of Patent: Jul. 1, 2025

(54) ELECTRONICALLY ACTUATED AND LOCKING GLOVE BOX SYSTEM

(71) Applicant: Southco, Inc., Concordville, PA (US)

(72) Inventor: Henry Daniel Birch, Worcester (GB)

(73) Assignee: Southco, Inc., Concordville, PA (US)

( * ) Notice: Subject to any disclaimer, the term of this patent is extended or adjusted under 35 U.S.C. 154(b) by 191 days.

(21) Appl. No.: 17/767,180

(22) PCT Filed: Oct. 8, 2020

(86) PCT No.: PCT/US2020/054744
§ 371 (c)(1),
(2) Date: Apr. 7, 2022

(87) PCT Pub. No.: WO2021/072048
PCT Pub. Date: Apr. 15, 2021

(65) Prior Publication Data
US 2022/0364395 A1 Nov. 17, 2022

Related U.S. Application Data

(60) Provisional application No. 62/912,729, filed on Oct. 9, 2019.

(51) Int. Cl.
*E05B 81/34* (2014.01)
*B60R 7/06* (2006.01)
(Continued)

(52) U.S. Cl.
CPC ............... *E05B 81/34* (2013.01); *B60R 7/06* (2013.01); *E05B 81/06* (2013.01); *E05B 81/14* (2013.01);
(Continued)

(58) Field of Classification Search
CPC .......... E05C 9/046; E05C 9/041; E05B 81/14; E05B 81/18; E05B 81/28; E05B 81/06;
(Continued)

(56) References Cited

U.S. PATENT DOCUMENTS 7,004,517 B2 2/2006 Vitry et al.
8,403,376 B2 * 3/2013 Greiner ............... E05B 63/0065
292/144
(Continued)

FOREIGN PATENT DOCUMENTS

CN 101218407 A 7/2008
CN 206409083 U 8/2017
(Continued)

OTHER PUBLICATIONS

Chinese Office Action for Chinese Application No. 202080071045.1, dated Feb. 25, 2023 with translation, 14 pages.
(Continued)

*Primary Examiner* — Kristina R Fulton
*Assistant Examiner* — Emily G. Brown
(74) *Attorney, Agent, or Firm* — Buchanan Ingersoll & Rooney PC (57) ABSTRACT

An electronic latch includes a housing, a motor having an output shaft, a gear arrangement comprising at least one gear that is configured to be driven by the output shaft of the motor, a rack coupled to the gear arrangement and configured to move in response to motion of the gear arrangement, and at least one pawl or pawl connector that is connected to the rack. Motion of the rack causes or permits the at least one pawl or pawl connector to move between (i) a withdrawn position and (ii) a deployed position in which the pawl or pawl connector is extended further from the housing as compared with the withdrawn position.

22 Claims, 13 Drawing Sheets

(51) Int. Cl.
*E05B 81/06* (2014.01)
*E05B 81/14* (2014.01)
*E05B 81/30* (2014.01)
*E05B 81/42* (2014.01)
*E05B 81/64* (2014.01)
*E05B 83/30* (2014.01)

(52) U.S. Cl.
CPC .............. *E05B 81/30* (2013.01); *E05B 81/42* (2013.01); *E05B 81/64* (2013.01); *E05B 83/30* (2013.01)

(58) Field of Classification Search
CPC .......... E05B 81/42; E05B 81/64; E05B 81/34; E05B 81/30; E05B 83/32; E05B 83/30; E05B 59/00; E05B 55/00
See application file for complete search history.

(56) References Cited

U.S. PATENT DOCUMENTS

| | | | |
|---|---|---|---|
| 8,590,351 B2 * | 11/2013 | Ookawara | E05C 9/047 292/37 |
| 9,827,949 B2 * | 11/2017 | Sugimoto | B60R 25/0215 |
| 10,081,970 B2 | 9/2018 | Aselage et al. | |
| 10,822,836 B2 | 11/2020 | Nakasone | |
| 11,035,157 B2 | 6/2021 | Cumbo | |
| 2001/0003925 A1 | 6/2001 | Swan | |
| 2001/0015305 A1 | 8/2001 | Spurr | |
| 2004/0069026 A1 | 4/2004 | Fukushima | |
| 2004/0182121 A1 | 9/2004 | Fukatsu et al. | |
| 2004/0250577 A1 | 12/2004 | Watanuki et al. | |
| 2005/0028177 A1 * | 2/2005 | Nishide | G11B 7/085 |
| 2005/0269755 A1 * | 12/2005 | Zhao | B25B 5/08 269/32 |
| 2006/0208495 A1 * | 9/2006 | Talukdar | E05B 83/30 292/39 |
| 2008/0191494 A1 * | 8/2008 | Carabalona | E05B 83/32 292/251.5 |
| 2008/0231060 A1 * | 9/2008 | Carabalona | E05B 81/20 292/251.5 |
| 2008/0256992 A1 * | 10/2008 | Chung | E05B 65/0811 70/77 |
| 2009/0165510 A1 * | 7/2009 | Sugimoto | B60R 25/02153 70/253 |
| 2011/0265586 A1 * | 11/2011 | Perkins | E05B 81/34 74/89.14 |
| 2013/0160538 A1 * | 6/2013 | Taurasi, I | E05B 81/64 29/428 |
| 2015/0152671 A1 * | 6/2015 | Nakasone | E05B 83/30 292/169 |
| 2015/0233147 A1 | 8/2015 | Martinez et al. | |
| 2017/0191289 A1 * | 7/2017 | Perkins | E05B 77/06 |
| 2018/0371795 A1 | 12/2018 | Nakasone | |
| 2019/0203509 A1 * | 7/2019 | Kondo | E05C 1/14 |
| 2020/0340276 A1 * | 10/2020 | Kulicki | E05B 81/36 |

FOREIGN PATENT DOCUMENTS

| | | | | |
|---|---|---|---|---|
| CN | 107614821 A | | 1/2018 | |
| CN | 107780726 A | | 3/2018 | |
| CN | 108505836 A | | 9/2018 | |
| CN | 109403754 A | * | 3/2019 | .............. B60R 7/06 |
| DE | 8901723 U1 | | 5/1989 | |
| DE | 102018112534 A1 | | 11/2018 | |
| EP | 3260635 A1 | | 12/2017 | |
| GB | 2554593 A | | 4/2018 | |
| JP | 6408147 B2 | | 10/2018 | |
| KR | 100547185 B1 | * | 1/2006 | |
| KR | 20120010010 A | | 2/2012 | |
| WO | 2006122151 A2 | | 11/2006 | |
| WO | 2016185973 A1 | | 11/2016 | |
| WO | WO-2019118201 A1 | * | 6/2019 | ............. E05B 77/38 |

OTHER PUBLICATIONS

International Preliminary Report on Patentability for International Application No. PCT/US2020/054744, issued Apr. 12, 2022, 6 pages.
International Search Report and Written Opinion for International Application No. PCT/US2020/054774, dated Jan. 29, 2021, 9 pages.
U.S. Appl. No. 62/599,162, filed Dec. 15, 2017, 26 pages.

* cited by examiner

ELECTRONICALLY ACTUATED AND LOCKING GLOVE BOX SYSTEM

CROSS REFERENCE TO RELATED APPLICATIONS

This Application is a U.S. National Phase Patent Application of PCT Patent Application No. PCT/US2020/054744, filed Oct. 8, 2020, which is related to, and claims the benefit of priority of U.S. Provisional Application No. 62/912,729, entitled ELECTRONICALLY ACTUATED AND LOCKING GLOVE BOX SYSTEM, filed on Oct. 9, 2019, the contents of each of which are incorporated herein by reference in their entirety for all purposes.

FIELD OF THE INVENTION

The present invention relates to the field of locks or connector systems configured to provide a mechanical connection between adjacent components, and particularly to locking systems for securing in a closed position and releasing from the closed position automotive glove box or accessory compartment doors.

BACKGROUND OF THE INVENTION

Automotive door closure systems, such as glove boxes and the like, typically include a door housing mounted to a dashboard of the vehicle, a door movably mounted to the door housing, and a lockable latch that cooperates with one or more strikers to hold the door in the closed position to cover the door housing. It has been found that there is a continuing need to improve upon or provide alternatives to existing door closure systems in the interests of convenience.

SUMMARY OF THE INVENTION

According to a first aspect of the present invention, an electronic latch includes a housing, a motor having an output shaft, a gear arrangement comprising at least one gear that is configured to be driven by the output shaft of the motor, a rack coupled to the gear arrangement and configured to move in response to motion of the gear arrangement, and at least one pawl or pawl connector that is connected to the rack. Motion of the rack causes the at least one pawl or pawl connector to move to (i) a withdrawn position from (ii) a deployed position in which the pawl or pawl connector is extended further from the housing as compared with the withdrawn position.

According to another aspect of the present invention, an electronic latch includes a housing, a motor having an output shaft, and a gear arrangement comprising at least one gear that is configured to be driven by the output shaft of the motor. The at least one gear comprises a cam lobe that is configured to engage a cam follower on a rack, thereby causing motion of the rack, and wherein motion of the rack causes a pawl to move to (i) a withdrawn position from (ii) a deployed position in which the pawl is extended further from the housing as compared with the withdrawn position.

According to still another aspect of the present invention, in an electronic latch including a motor, a gear configured to be driven by an output shaft of the motor, a rack coupled to the gear, and at least one pawl that is connected to the rack, a method of operating the electronic latch comprises the steps of (a) engaging a first cam lobe on the gear with a first cam follower on the rack to move the rack in a first direction, which causes the at least one pawl to move toward a withdrawn position with respect to a striker; and (b) engaging a second cam lobe on the gear with a second cam follower on the rack to control the movement of the rack in a second direction, which allows the at least one pawl to move toward a deployed position with respect to the striker.

BRIEF DESCRIPTION OF THE DRAWINGS

The above and other aspects and features of the present invention will become more apparent to those of ordinary skill in the art by describing in detail exemplary embodiments thereof with reference to the attached drawings.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Various terms are used throughout the disclosure to describe the physical shape or arrangement of features. A number of these terms are used to describe features that conform to a cylindrical or generally cylindrical geometry characterized by a radius and a center axis perpendicular to the radius. Unless a different meaning is specified, the terms are given the following meanings. The terms "longitudinal", "longitudinally", "axial" and "axially" refer to a direction, dimension or orientation that is parallel to a center axis. The terms "radial" and "radially" refer to a direction, dimension or orientation that is perpendicular to the center axis. The terms "inward" and "inwardly" refer to a direction, dimension or orientation that extends in a radial direction toward the center axis. The terms "outward" and "outwardly" refer to a direction, dimension or orientation that extends in a radial direction away from the center axis.

In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation.

Terms concerning attachments, coupling and the like, such as "mounted," "connected" and "interconnected," refer to a relationship wherein structures are secured or attached to one another either directly or indirectly through intervening structures, as well as both movable or rigid attachments or relationships, unless expressly described otherwise.

Figure 1A:
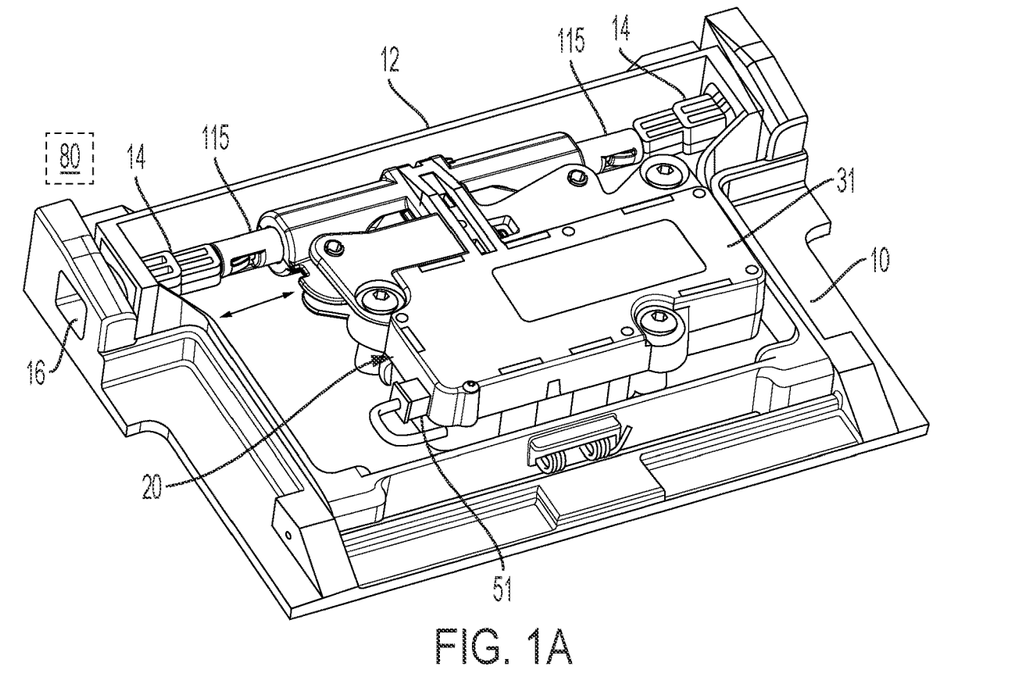
FIG. 1A is an isometric view of a glove box door assembly depicted in a closed state.
Figure 1B:
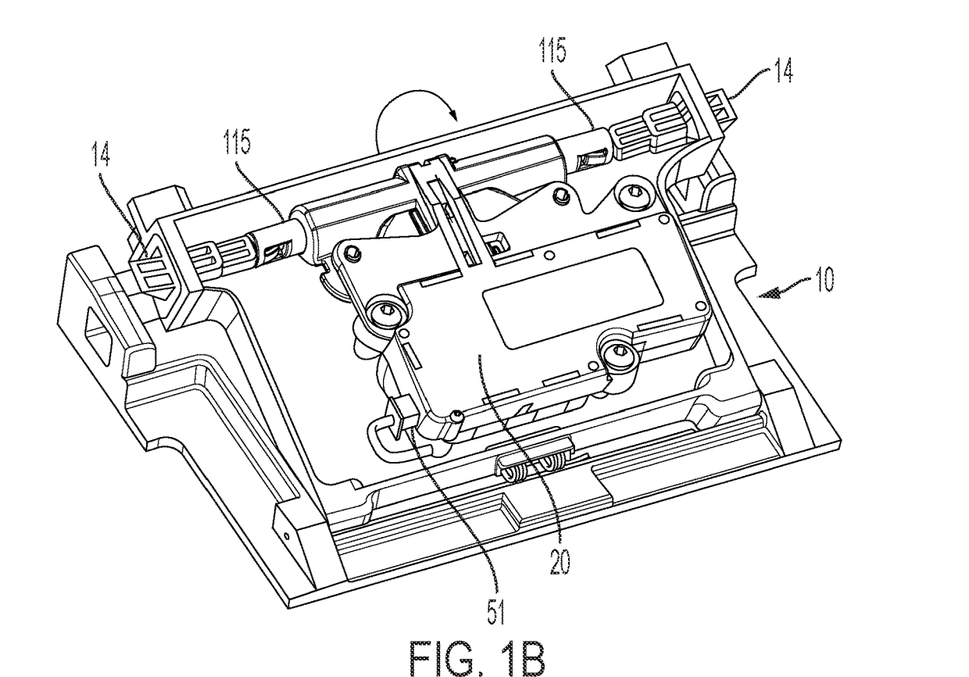
FIG. 1B is an isometric view of the glove box door assembly of FIG. 1A depicted in an open state.
Figure 2:
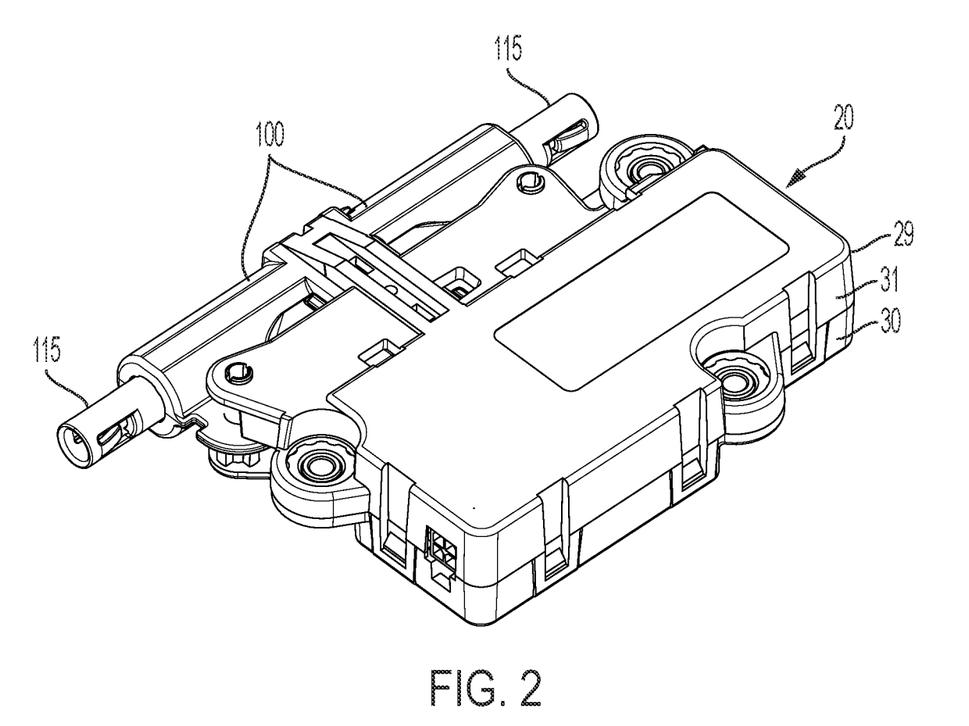
FIG. 2 is an isometric view of an electronic multi-point latching system of the glove box assembly of FIG. 1A.

FIGS. 1A and 1B are isometric views of a glove box system including a door housing 10, a door 12 that is movably mounted to the door housing 10, and an electronic multi-point latching system 20 (system 20 hereinafter) for (i) maintaining the door 12 in a closed and locked state and (ii) releasing the door 12 from the closed and locked state. The door 12 is shown in a closed state in FIG. 1A and an open state in FIG. 1B. Pawls 14 extending from the system 20 interact with strikers 16 in the door housing 10 to control the state of the door. When the pawls 14 are positioned within the strikers 16, the door 12 is maintained in a closed and locked state, where when the pawls 14 are not positioned within the strikers 16, the door 12 is maintained in an unlocked state.

The door housing 10 includes a storage space (not shown), which is accessible to a user when the door 12 is in the open state, and is inaccessible to the user when the door 12 is in the closed state (as shown). The door 12, as viewed in FIG. 1A, includes a hollow region that accommodates the system 20. The door 12 may also be referred to herein as an access panel. The door housing 10 may be a vehicle glove box or a vehicle center console, for example. The door housing 10 is not limited for use with vehicles.

An exemplary glove box door and door housing are shown in U.S. Pat. No. 10,081,970 to Ford and U.S. Pat. No. 7,004,517 to Southco Inc., each of which is incorporated by reference in its entirety and for all purposes. The system 20 is configured to retain the door 12 in a latched position, as well as selectively open the door with respect to the door housing 10. The system 20 is configured for use with various types of doors, and is not limited for use with vehicle glove boxes.

Referring now the features of the system 20, the system 20 is shown, in one form or another, in FIGS. 2-8F. The system 20 is an assembly comprising a housing 29 including a base housing 30 and a housing lid 31 that covers the base housing 30 and is mounted thereto by fasteners. An interior space is defined between the base housing 30 and the housing lid 31. A series of components are positioned within the interior space of the housing 29 to cause movement of the pawls 14. The various components of the system 20 will be described hereinafter.

Figure 3:
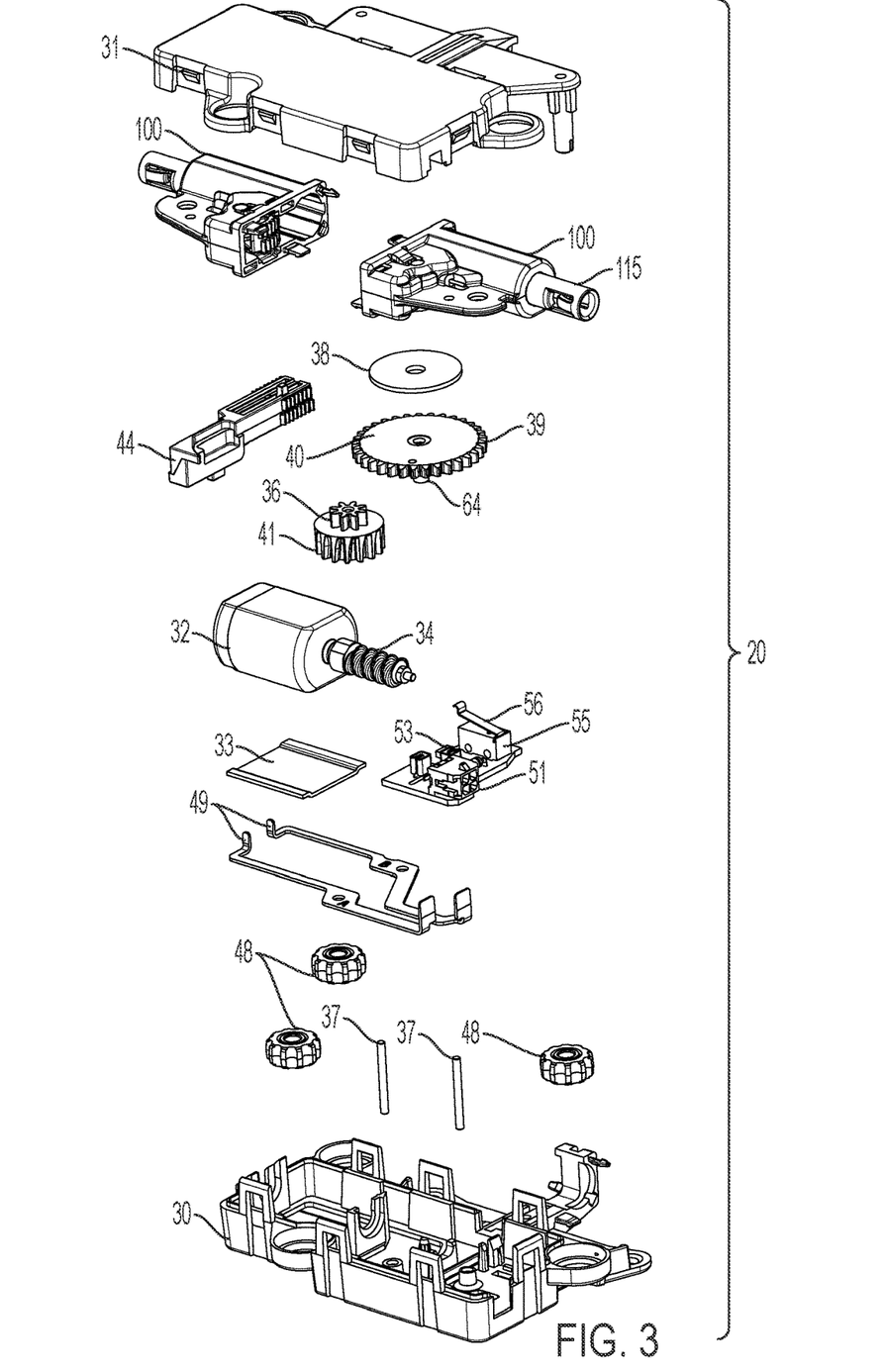
FIG. 3 is an exploded view of the electronic multi-point latching system of FIG. 2.
Figure 5A:
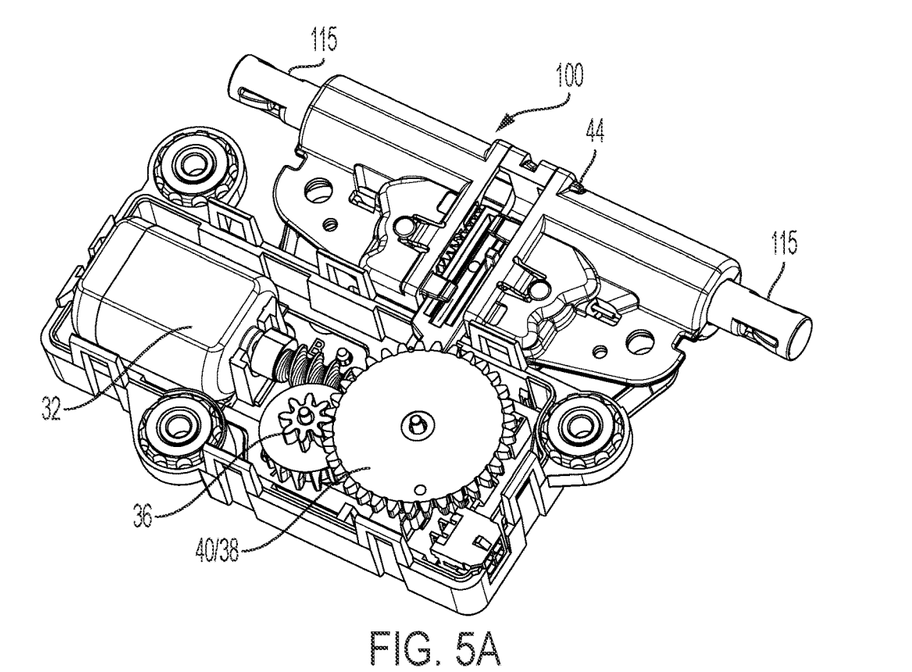
FIG. 5A is an isometric view of the latching system of FIG. 2, wherein the system is shown in a deployed state.

Referring now to FIGS. 3 and 5A, an electric motor 32 is mounted to the base 30, and an isolator pad 33 is positioned beneath the motor 32 to dampen vibrations produced by the motor 32. The motor 32 has a rotatable output shaft with a fixed worm 34. A worm gear 36 is rotatably mounted to the base 30 by a shaft 37 extending upward from the base 30. A lower set 41 of teeth on the worm gear 36 is non-rotatably connected to and meshes with teeth on the output shaft worm 34 such that the worm gear 36 rotates along with the output shaft worm 34. The upper set of teeth on the worm gear 36 mesh with teeth 39 of a cam gear 40. The cam gear 40 is also rotatably mounted with respect to the base 30 by a second shaft 37. A foam pad 38, which may also be referred to herein as a friction feature, is sandwiched between the cam gear 40 and the lid 31. A series of cams 64a and 64b (referred to collectively as cams 64) on the cam gear 40 interact with a rack 44 to cause or control translation of the rack 44 with respect to the housing 29. The gears 34, 36, 40 and/or 44 may be referred to herein as a gear arrangement.

The teeth 41 of the worm gear 36 include a simple draft for easy molding, as is disclosed and claimed in U.S. Patent App. No. 62/864,567 to Southco, which is incorporated by reference herein in its entirety. Thus, a spiral ejector mechanism is not required for forming the teeth 41.

A series of elastomeric isolators 48 are mounted between the base 30 and the lid 31. The isolators 48 either prevent or reduce any gear or motor high frequency vibrations from being transmitted to the glove box door 12.

Two electrically conductive tracks 49 interconnect the motor 32, the electrical plug 51 (FIG. 1A) and the printed wiring assembly (PWA) 53 (otherwise referred to as a circuit board). One track 49 interconnects the motor 32 to the plug 51, and the other track 49 may electrically connect plug 51 to the PWA 53. Alternatively, both tracks 49 may connect motor 32 to PWA 53, and the PWA 53 may be connected to the plug 51 by one or more wires, for example. Electrical signals and power are delivered to/from the system 20 via the plug 51 or a lead otherwise attached to PWA 53. The plug 51 or lead may be connected to a computer or body control unit (BCU) in the vehicle. The PWA 53 may include memory, a controller, a diode, a capacitor, an input connector, a power source, an extra switch and/or a receiver/transmitter. An electronic switch 55 is mounted to the PWA 53. A wiper arm 56 extends from the switch 55 and is positioned to engage with a channel 58 (FIG. 8F) having a predetermined circumferential length that is formed on one side of the cam gear 40. The switch 55 is configured to sense rotation of the cam gear 40 based upon the interaction between the wiper arm 56 and the channel 58.

The signal outputted by the switch 55 (or another switch on the PWA 53) may be outputted via the plug 51 to the BCU, such that the BCU can determine when the pawls 14 are withdrawn, which signifies that the door 12 is open. The BCU may be configured to activate a light or bulb within the glove box when the door 12 is open.

The channel 58 may be referred to herein as an indexing means. As an alternative to the channel 58, those skilled in the art will recognize that the indexing means could be a surface, recess, marking, magnet, circuit, magnetic feature, optical feature, post, slot, or pin, for example, or any other feature on the gear 40 that can be used for tracking movement of the gear 40. Also, the indexing means could be provided on a different gear of the gear arrangement.

The electronic switch 55 is configured to detect rotation of the gear 40, and communicate one or more rotational positions of the gear 40 to a processor and/or controller of the system 20 or the BCU. The switch 56 may be generally referred to as a sensor, and the switch 55 may be substituted by a rotary encoder, Hall-effect sensor, a Linear Variable Differential Transformer (LVDT), potentiometer, optical proximity sensor, transducer, eddy-current sensor, or photodiode, for example.

Figure 4:
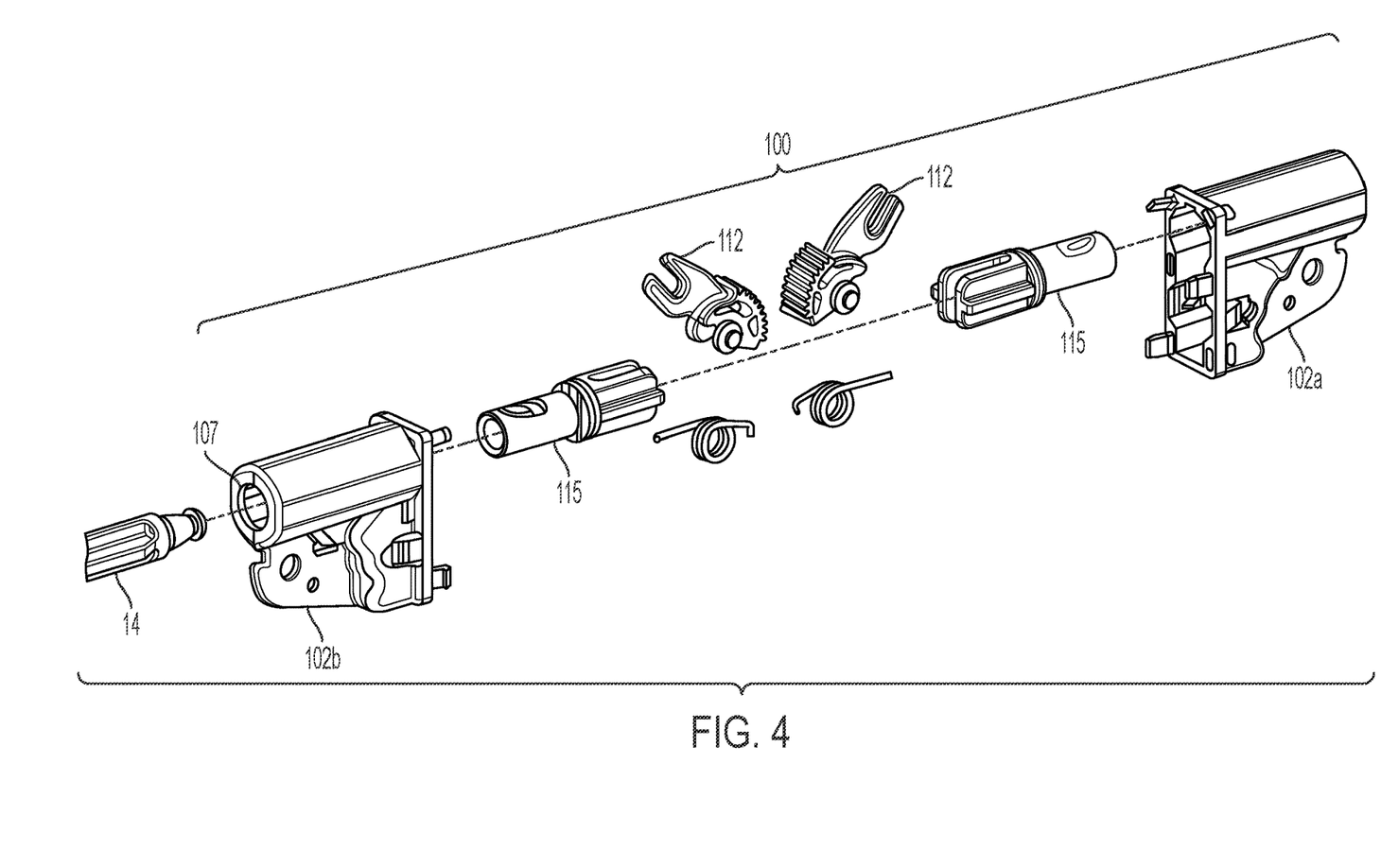
FIG. 4 is an exploded view of a portion of the multi-point latching system of FIG. 2 in addition to a pawl.

Turning now to FIG. 4, the details of latch sub-assembly 100 are shown in FIG. 4 and described in PCT Patent App. Pub. No. WO2019118201 as well as U.S. Patent App. No. 62/599,162 to Minnich, which are each incorporated by reference herein in their entirety. The latch sub-assembly 100 generally includes housing parts 102a and 102b, pawl connectors 115 positioned at least partially within respective housing parts 102a and 102b, and spring-loaded gears 112, which are configured to move respective pawl connectors 115 between the deployed and withdrawn states. The pawl connectors 115 move within openings 107 disposed on the ends of the housing parts 102 and are captivated to the housing parts 102 such that the pawl connectors 115 cannot become detached from the housing parts 102. Each pawl connector 115 is connected to one of the pawls 14 (one shown). The gears 112 are spring-loaded such that the pawl connector 115 (and pawls 14 connected thereto) are biased toward the deployed state. Further details regarding the latch assembly 100 are described in PCT Patent App. Pub. No. WO2019118201, and are not repeated herein.

The pawls 14 are capable of laterally translating from side to side, as depicted by the arrows in FIG. 1A. The pawls 14 move synchronously with each other and in an opposite translational direction thereto because the pawls 14 are interconnected together by the rack 44 (unlike the gears 112 that are described in WO2019118201). Specifically, the teeth on the gears 112 are meshed with teeth on the rack 44, such that movement of the rack 44 causes simultaneous translation of the pawls 14 between the deployed and withdrawn states. It should be understood that the latch sub-assembly 100 is not limited to the arrangement disclosed in WO2019118201 and U.S. Patent App. No. 62/599,162 to Minnich.

Figure 9A:
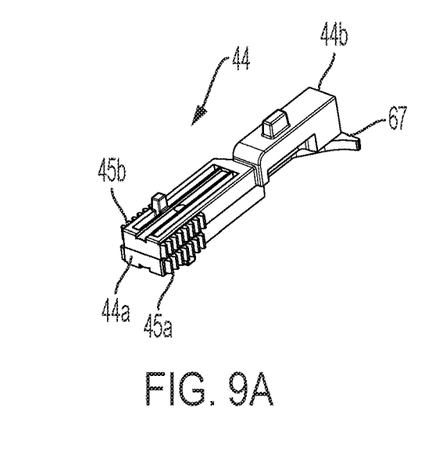
FIGS. 9A and 9B are isometric views of the rack of the latching system of FIG. 2.
Figure 9B:
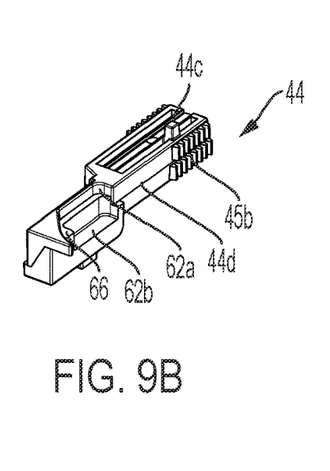
Figures 9C, 9D:
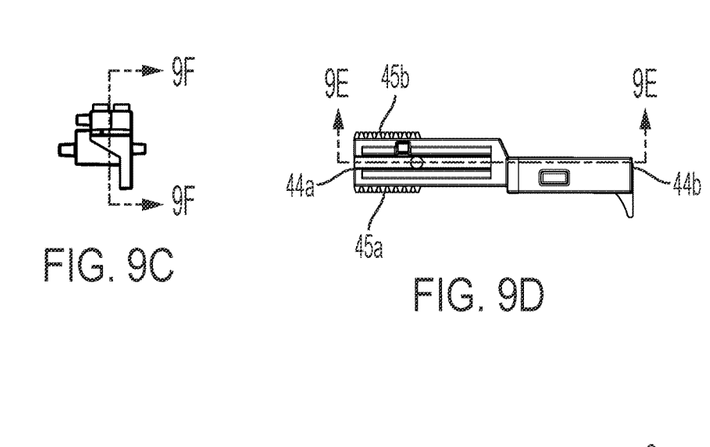
FIGS. 9C, 9D and 9G are elevational views of the rack of FIG. 9A.
Figure 9E:
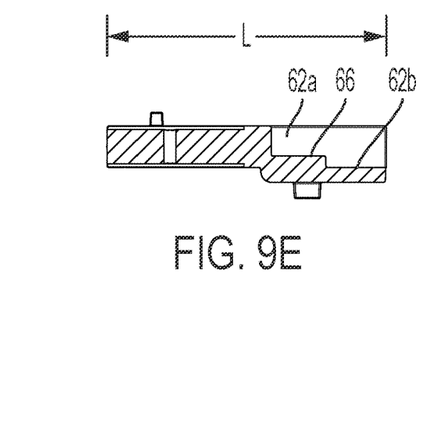
FIGS. 9E and 9F are cross-sectional views of the rack of FIGS. 9D and 9C taken along the lines 9E-9E and 9F-9F, respectively.
Figure 9F:
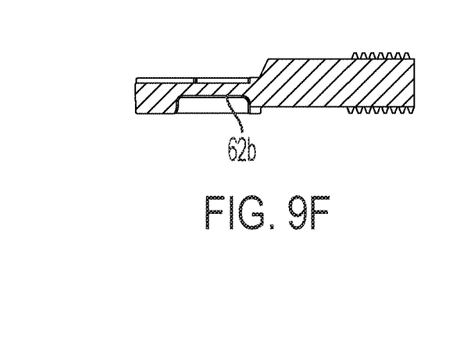
Figure 9G:
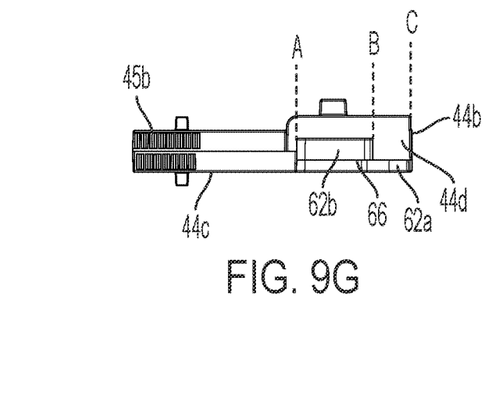
Figure 10A:
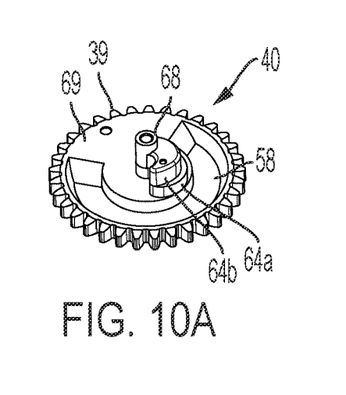
FIG. 10A is an isometric view of the cam gear of the latching system of FIG. 2.
Figure 10B:
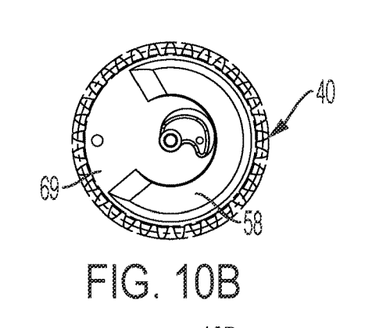
FIGS. 10B, 10C and 10F are elevation views of the cam gear of FIG. 10A.
Figure 10C:
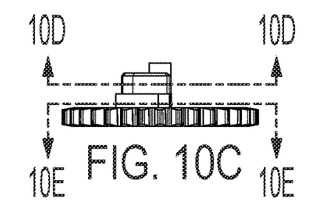
Figure 10D:
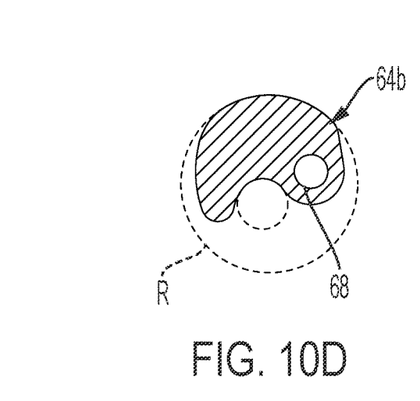
FIGS. 10D, 10E and 10G are cross-sectional views of the cam gear of FIGS. 10C, 10C and 10F taken along the lines 10D-10D, 10E-10E and 10G-10G, respectively.
Figure 10E:
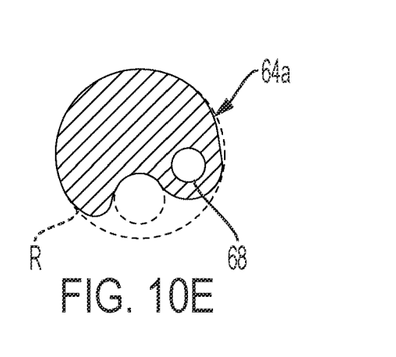
Figure 10F:
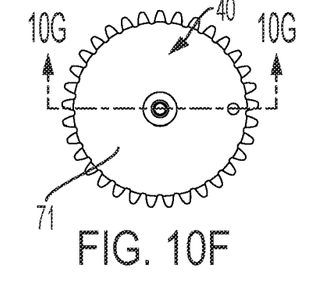
Figure 10G:
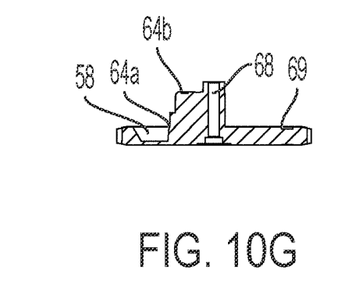
Figure 11:
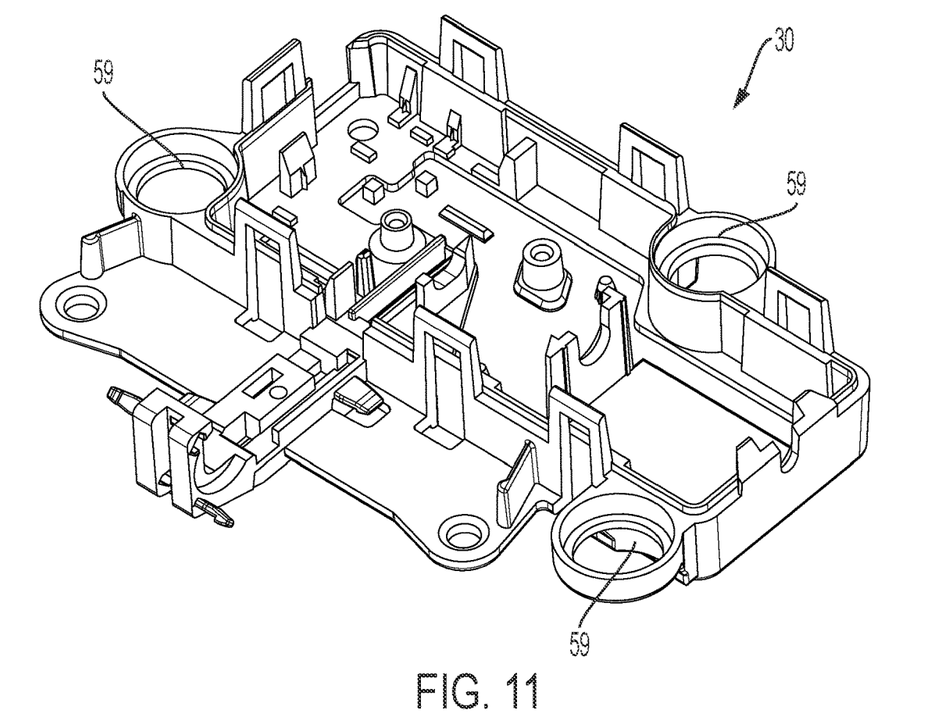
FIG. 11 is an isometric view of the housing base of the latching system of FIG. 2.
Figure 12:
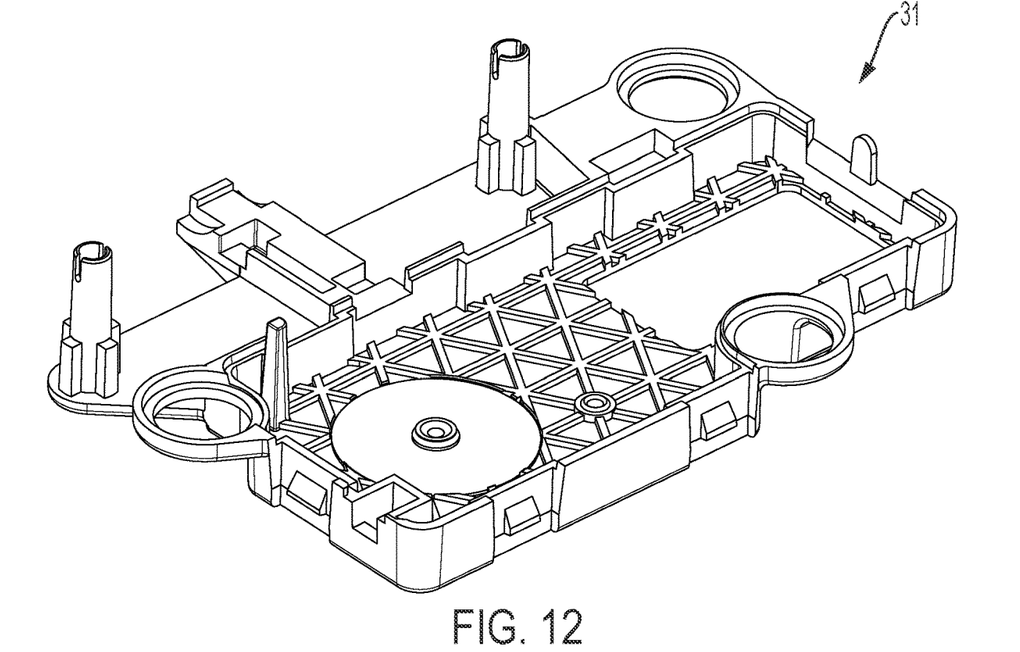
FIG. 12 is an isometric view of the housing lid of the latching system of FIG. 2.

Turning now to the individual components of the system 20 shown in FIGS. 9A-12, the base housing 30 is shown in FIG. 11. The components of the system 20 are mounted to the bosses, shafts and other features disposed on the interior facing surface of the base housing 30. A series of circular openings 59 are disposed on the top surface of the base 30 for receiving the isolators 48. FIG. 12 depicts the housing lid 31 of the system 20. The housing lid 31 covers the components mounted to the base housing 30 and conceals the interior space defined between the base housing 30 and the lid 31. Fasteners, clips, clamps, welds or adhesive (for example), may be used for fastening the base housing 30 the lid 31.

FIGS. 9A-9F depict the rack 44. The rack 44 is an elongated body having a rectangular or square cross-section that extends along length dimension 'L' between a top end 44a and a bottom end 44b. Two sets of gear teeth 45a and 45b are disposed at the top end 44a of the rack 44, and extend along the length dimension L. The sets of gear teeth 45a and 45b are disposed on opposite sides of the elongated body of the rack 44. In an assembled form of the system 20, one set of gear teeth 45a meshes with one of the gears 112 of the latch sub-assembly 100, whereas the other set of gear teeth 45b meshes with the other gear 112 of the latch sub-assembly 100. Accordingly, movement of the rack 44 results in simultaneous rotation of both gears 112. A side 44c of the rack 44, which interconnects the sides upon which the teeth 45 are disposed, is positionable to face (or positionable against) the gear 40.

Cam follower surfaces 62a and 62b are disposed in a recess formed in the bottom end 44b of the rack 44. The surfaces 62a and 62b are formed in the side 44c of the rack 44 as well as the side 44d of the rack 44 (i.e., the side on which the gear 45b is formed). The first cam follower surface 62a is an elongated U-shaped curved surface that is defined closest to side 44c, which side 44c is positionable to face (or positionable against) the gear 40. The second cam follower surface 62b is also an elongated U-shaped curved surface that is disposed adjacent to surface 62a at a location further from surface 44c than cam follower 62a. The second cam follower surface 62b is connected to the first cam follower surface 62a by a shoulder 66. A ramp 67 extends from the bottom end 44b of the rack 44. The exit of the cam follower surface 62a is formed on the curved surface of the ramp 67.

Figure 8F:
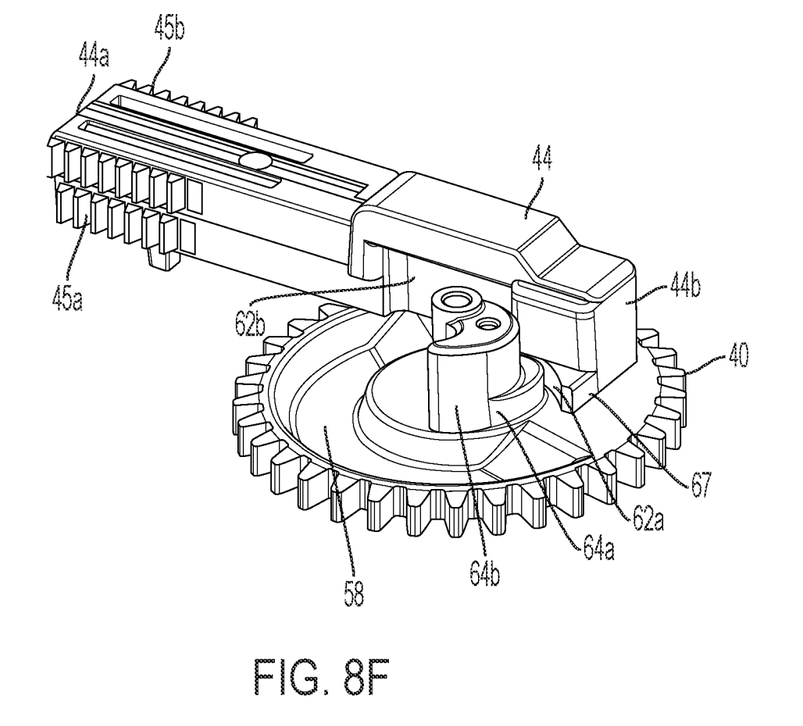
FIG. 8F is an isometric view of the assembly shown in FIG. 8E.

Referring now to FIG. 9G, the entrance of both cam follower surfaces 62a and 62b start at point A. The exit of cam follower surface 62a is located at point C (i.e., at the bottom end 44b of the rack 44), whereas the exit of cam follower surface 62b is located at point B. Point B is spaced from the bottom end 44b of the rack 44. As will be explained hereinafter, as best shown in FIG. 8F, in an assembled form of the system 20, the cam follower surface 62a of the rack 44 is positioned to interact with cam lobe 64a on the cam gear 40, whereas the cam follower surface 62b of the rack 44 is positioned to interact with cam lobe 64b on the cam gear 40.

FIGS. 10A-10G depict the cam gear 40. The cam gear 40 has a circular body with a set of gear teeth 39 extending along its outer perimeter. A thru-hole 68 extends through the center of the gear 40 and through its thickness. In an assembled form of the system 20, one of the shafts 37 passes through the hole 68 for mounting the gear 40 within the housing 29. The channel 58, which is a c-shaped depression, is defined on the surface 69 of the gear 40. The surface 69 of the gear 40 is positioned to face the rack 44. The opposing surface 71 of the gear 40 may include a friction surface, in the form of ribs or depressions, which may interact with a friction feature 38 on the housing lid 31 to prevent over-rotation of the gear 40.

Cam surfaces 64a and 64b extend upward from the surface 69 of the cam gear 40. The cam surface 64a is a rounded surface (in the circumferential direction) and is positioned closest to the surface 69. The cam surface 64b is also a rounded surface (in the circumferential direction) and is positioned further from the surface 69 at an elevation above the cam surface 64a. As best shown in FIGS. 10D and 10E, a larger proportion of the cam surface 64a follows the cam radius R than the cam surface 64b. It follows that the effective cam length of the cam surface 64a is greater than the effective cam length of the cam surface 64b.

Figure 8A:
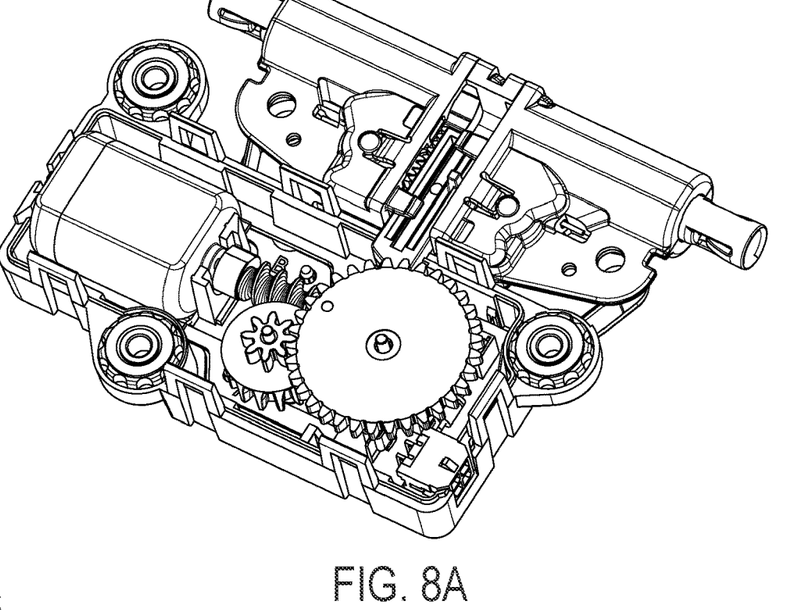
FIG. 8A is another isometric view of the latching system of FIG. 2, wherein the system is shown in a partially withdrawn state.
Figures 8B, 8C:
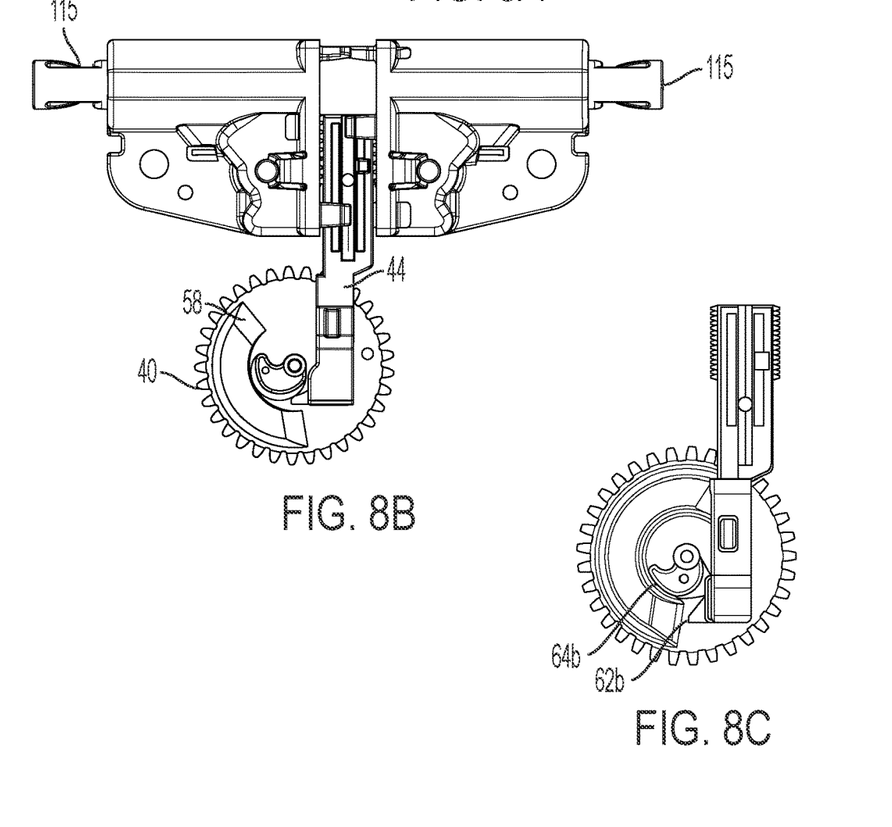
FIG. 8B is an elevation view of the latching system of FIG. 8A with various components removed to reveal interaction between the rack and the cam gear.
FIG. 8C is another elevation view of the latching system of FIG. 8A showing only the rack and the cam gear.

Referring now to an exemplary method of operating the system 20, FIGS. 5A-8E depict sequential movement of the pawl connectors 115 (to which the pawls 14 are attached) from the deployed position (FIG. 5B), to the withdrawn position (FIG. 6B) and back towards the deployed position (FIG. 8B). The door 12 initially starts in a closed and locked state (FIG. 1A), in which the pawls 14 are deployed and positioned in their respective strikers 16. In the closed state of the door 12, it may not be possible to open the door 12. In the deployed position, the wiper 56 of the switch 55 is positioned within the channel 58 of the gear 40.

To open the door 12, a user contacts, activates or depresses a remotely-located button, switch or icon 80, by way of example. The remotely-located button, switch or icon 80, which is shown schematically in FIG. 1A, may be located on a remote control, the dashboard or a touchscreen of a vehicle, by way of non-limiting example. Activating the remotely-located button, switch or icon 80 causes the BCU of the vehicle to activate the motor 32. The motor 32 then rotates the output shaft 34, which causes rotation of the gears 36 and 40. Specifically, the motor 32 rotates the gear 40 by a single revolution, as sensed and permitted by the switch 55. Once the wiper 56 of the switch 55 reenters the channel 58 of the gear 40, the switch opens and consequently deactivates the supply of power to the motor 32. Interaction between the cams 64 and cam followers 62 during the single revolution will now be described.

Figures 5B, 5C:
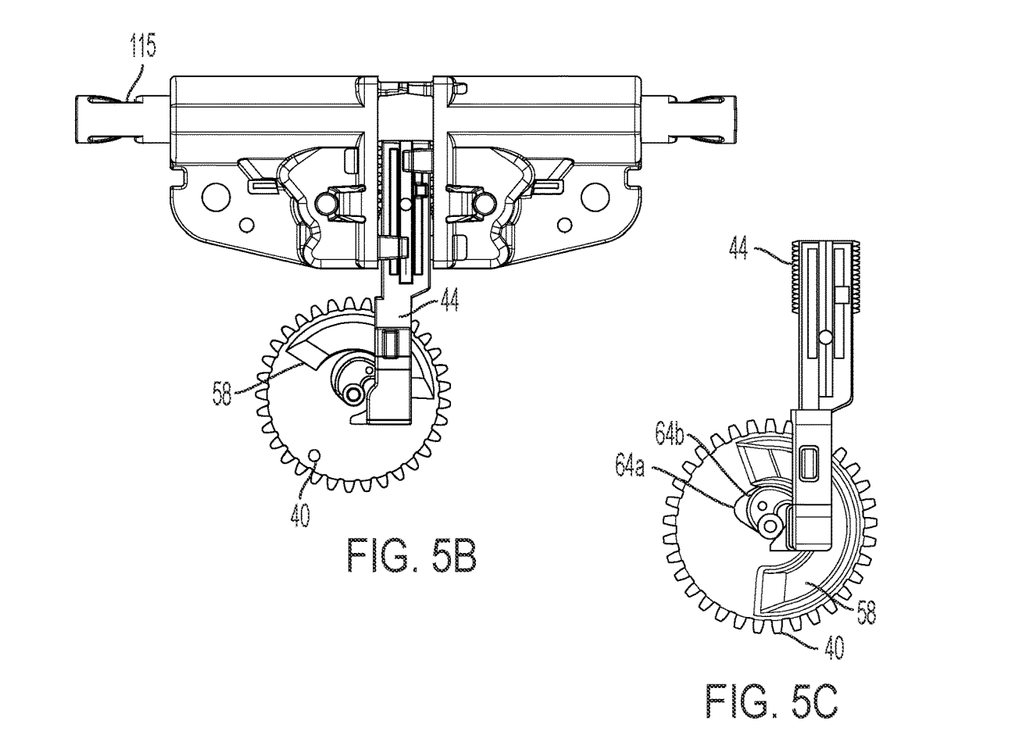
FIG. 5B is an elevation view of the latching system of FIG. 5A with various components removed to reveal interaction between the rack and the cam gear.
FIG. 5C is another elevation view of the latching system of FIG. 5A showing only the rack and the cam gear.
Figure 6A:
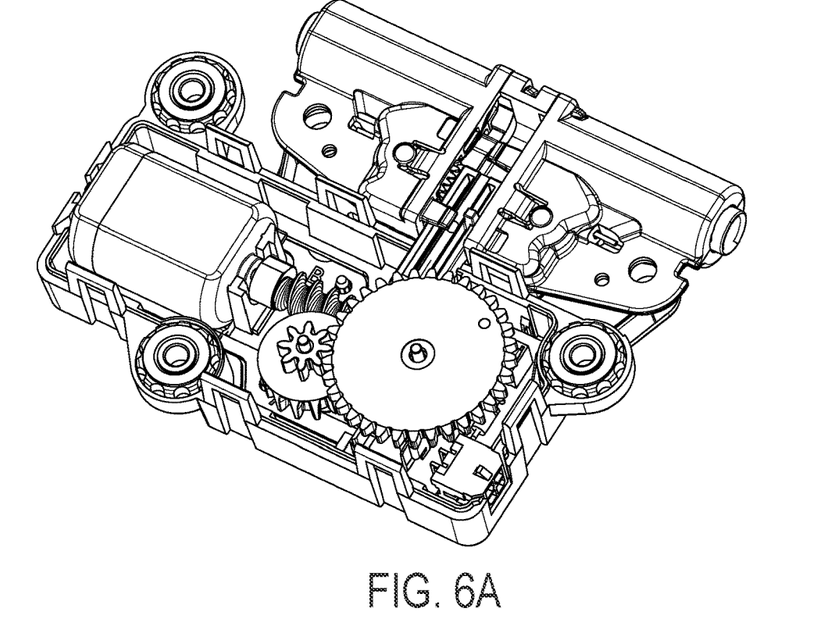
FIG. 6A is another isometric view of the latching system of FIG. 2, wherein the system is shown in a withdrawn state.
Figures 6B, 6C:
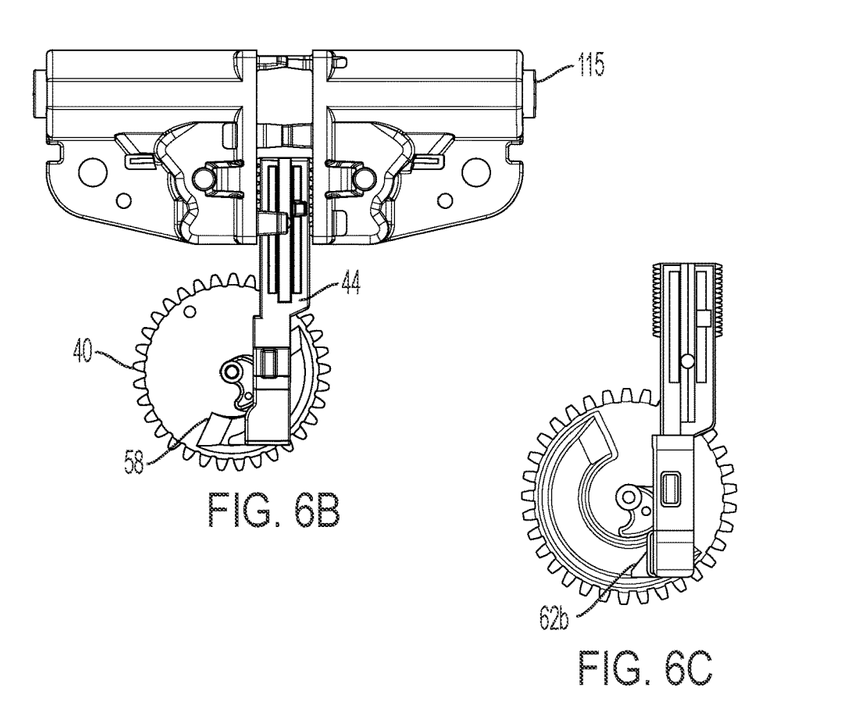
FIG. 6B is an elevation view of the latching system of FIG. 6A with various components removed to reveal interaction between the rack and the cam gear.
FIG. 6C is another elevation view of the latching system of FIG. 6A showing only the rack and the cam gear.
Figure 7A:
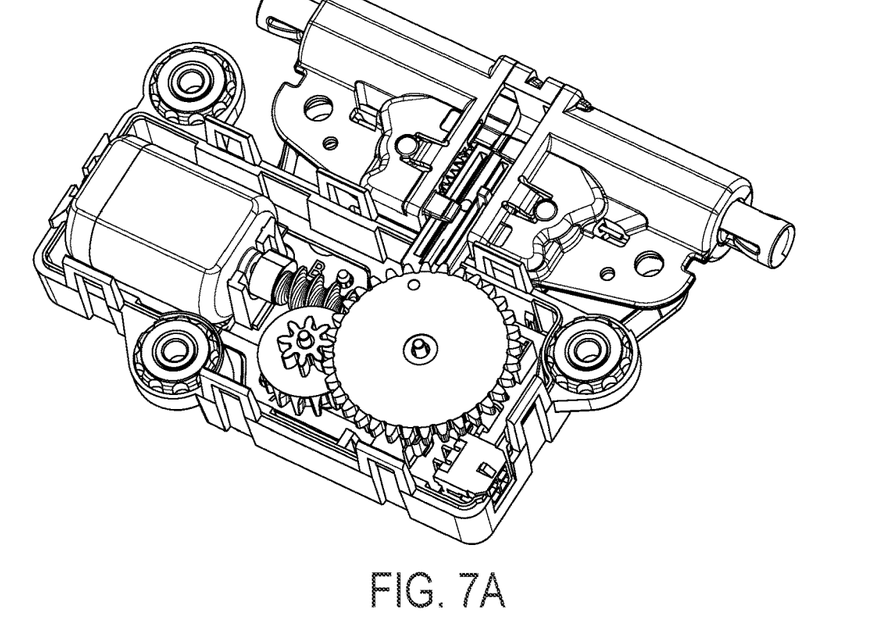
FIG. 7A is another isometric view of the latching system of FIG. 2, wherein the system is shown in a partially withdrawn state.
Figures 7B, 7C:
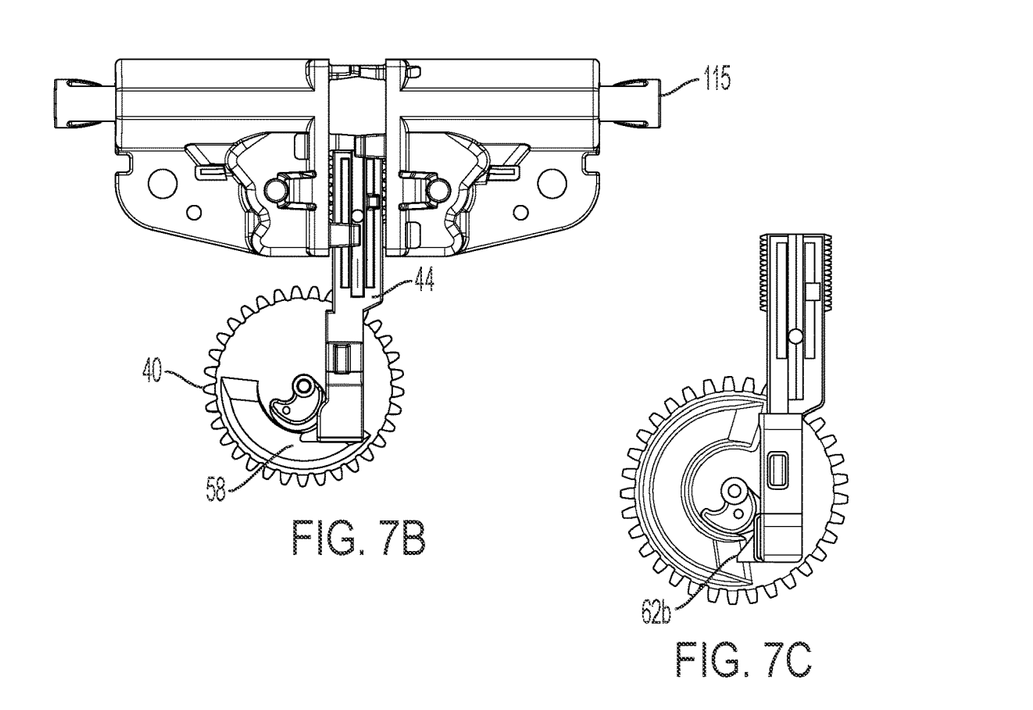
FIG. 7B is an elevation view of the latching system of FIG. 7A with various components removed to reveal interaction between the rack and the cam gear.
FIG. 7C is another elevation view of the latching system of FIG. 7A showing only the rack and the cam gear.

Starting from the deployed state of the system 20 shown in FIGS. 5A-5C, the cam 64b is positioned against the cam follower 62b. Activating the motor 32 causes the output shaft 34 to rotate the gear 40 (via gear 36), which causes the cam 64b on the gear 40 to bear on the cam follower 62b of the rack 44, which causes the rack 44 to translate in a downward direction, which causes rotation of the gears 112, which causes inward movement of the pawl connectors 115 and the pawls 14. The system 20 may then be maintained in the withdrawn state shown in FIGS. 6A-6C. At this stage, the door 12 is unlocked and may be open.

Figure 8D:
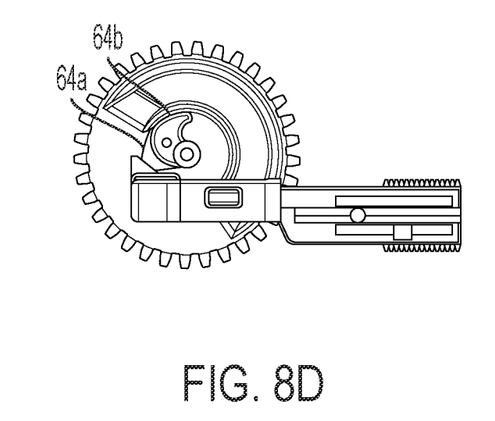
FIG. 8D is another elevation view of the latching system of FIG. 8C showing only the rack and the cam gear showing further rotation of the cam gear as compared with FIG. 8C.
Figure 8E:
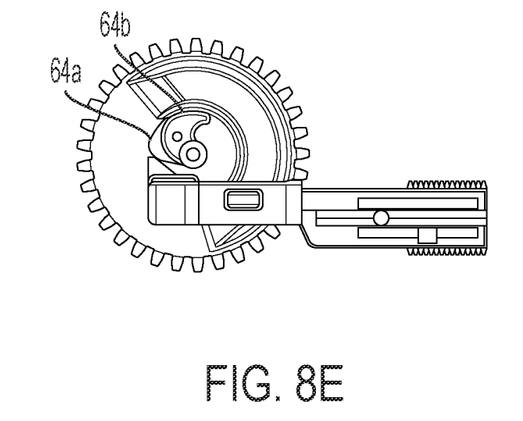
FIG. 8E is another elevation view of the latching system of FIG. 8C showing only the rack and the cam gear showing further rotation of the cam gear as compared with FIG. 8D.

Further rotation of the output shaft 34 of the motor 32 in the same rotational direction causes the cam 64a to bear on the cam follower 62a of the rack 44 while the cam 64b separates from the cam follower 62b. Engagement between the cam 64a and the cam follower 62a allows the rack 44 to translate in an upward direction and in a controlled manner under the biasing force of the springs attached to the gears 112, which rotate in the opposite rotational direction. This causes outward movement of the pawl connectors 115 and the pawls 14 toward the deployed position. The engagement between the gently sloping surfaces 62a and 64a prevents the rack 44 from snapping back in the upward direction to the deployed position, thereby preventing an undesirable sound such as a slap or clack. The system 20 is then positioned in the partially deployed state shown in FIGS. 7A-7C. Further rotation of the output shaft 34 of the motor 32 in the same rotational direction causes the cam 64a to further bear on the cam follower 62a of the rack 44 (while the cam 64b remains separated from the cam follower 62b), which causes the pawl connectors 115 and the pawls 14 to move progressively further toward the deployed position, as shown in FIGS. 8C-8E. At the stage shown in FIG. 8E, the wiper 56 of the switch 55 reenters the channel 58 of the gear 40, the switch opens and consequently deactivates the supply of power to the motor 32. The upper surface 71 of the gear 40 interacts with a friction feature 38 on the housing lid 31 to prevent over-rotation of the gear 40. The gear 40 ultimately stops at the position shown in FIG. 5C. The system 20 is then maintained in a deployed state, and the door 12 will be locked to the housing 10 once it is closed.

To unlock the glove box during a power failure or other situation requiring a manual override of the system 20, a user can push on one of the pawls 14 against the bias of the spring loaded gears 112 to release the pawls 14 from their respective strikers. The movement of the rack 44 will not be impeded by the cam on the gear 40.

It should be understood that the above description of operating the system 20 is not limited to any step or sequence of steps, and may vary from that which is shown and described without departing from the scope and spirit of the invention.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. An electronic latch comprising:
    a housing;
    a motor having an output shaft;
    a gear arrangement comprising at least one gear that is configured to be driven by the output shaft of the motor;
    a rack coupled to the gear arrangement and configured to move in response to motion of the gear arrangement;
    at least one pawl or pawl connector that is connected to the rack such that motion of the rack causes the at least one pawl or pawl connector to move to (i) a withdrawn position from (ii) a deployed position in which the pawl or pawl connector is extended further from the housing as compared with the withdrawn position;
    wherein the at least one gear comprises two cam lobes that are configured to sequentially engage two separate cam followers on the rack, such that only one pair of the cam lobe and the cam follower is in contact relative to each other at a time; and
    wherein interaction between one of the two cam lobes with one of the two cam followers permits the pawl or pawl connector to move toward the deployed position in a controlled manner, and interaction between the other of the two cam lobes with the other of the two cam followers causes the pawl or pawl connector to move toward the withdrawn position.

2. The electronic latch of claim 1, wherein the rack is configured to translate in response to rotation of the output shaft of the motor.

3. The electronic latch of claim 1, wherein the housing accommodates the motor and the gear arrangement.

4. The electronic latch of claim 1, further comprising two pawls or pawl connectors that are each connected to the rack such that motion of the rack causes each pawl or pawl connector to move between the deployed and withdrawn positions.

5. The electronic latch of claim 1, further comprising a pawl connected to the pawl connector, wherein, in the deployed position, the pawl is configured to engage a striker.

6. The electronic latch of claim 1, wherein the two cam lobes are configured to engage the two separate cam followers on the rack in a sequential manner.

7. The electronic latch of claim 1, wherein a geometry of an outer perimeter of each cam lobe is different.

8. The electronic latch of claim 1, further comprising an indexing means on the gear that is configured to engage a sensor for sensing motion of the gear.

9. A motor vehicle glove box comprising the electronic latch of claim 1.

10. The electronic latch of claim 1, wherein the two cam lobes extend upward directly from a surface of the gear.

11. The electronic latch of claim 10, wherein the two cam lobes each comprises a rounded surface in the circumferential direction.

12. The electronic latch of claim 11, wherein one of the two cam lobes is positioned farther from the surface of the gear at an elevation above the other of the two cam lobes.

13. The electronic latch of claim 11, wherein one of the two cam lobes has an effective cam length L1 and the other of the two cam lobes has an effective cam length L2, and wherein L1 is greater than L2.

14. An electronic latch comprising
a housing;
a motor having an output shaft;
a gear arrangement comprising at least one gear that is configured to be driven by the output shaft of the motor, the at least one gear comprising two cam lobes that are configured to sequentially engage two separate cam followers on a rack, such that only one pair of the cam lobe and the cam follower is in contact relative to each other at a time, thereby causing motion of the rack, and wherein motion of the rack causes a pawl to move to (i) a withdrawn position from (ii) a deployed position in which the pawl is extended further from the housing as compared with the withdrawn position; and
wherein interaction between one of the two cam lobes with one of the two cam followers permits the pawl to move toward the deployed position in a controlled manner, and interaction between the other of the two cam lobes with the other of the two cam followers causes the pawl to move toward the withdrawn position.

15. The electronic latch of claim 14, wherein a geometry of an outer perimeter of the cam lobes is different.

16. The electronic latch of claim 14, further comprising an indexing means on the gear that is configured to engage a sensor for sensing motion of the gear.

17. In an electronic latch including a motor, a gear configured to be driven by an output shaft of the motor, a rack coupled to the gear, and at least one pawl that is connected to the rack, a method of operating the electronic latch comprises:
engaging a first cam lobe on the gear with a first cam follower on the rack to move the rack in a first direction, which causes the at least one pawl to move toward a withdrawn position with respect to a striker; and
after engaging the first cam lobe on the gear with the first cam follower, engaging a second cam lobe on the gear with a second cam follower on the rack to permit movement of the rack in a second direction, which permits the at least one pawl to move toward a deployed position with respect to the striker;
wherein such that only one pair of the first cam lobe or the second cam lobe is in contact with the first cam follower or the second cam follower at a time.

18. The electronic latch of claim 17, wherein the engaging steps are sequential.

19. An electronic latch comprising:
a housing;
a motor having an output shaft;
a gear arrangement comprising at least one gear that is configured to be driven by the output shaft of the motor;
a rack coupled to the gear arrangement and configured to move in response to motion of the gear arrangement;
at least one pawl or pawl connector that is connected to the rack such that motion of the rack causes the at least one pawl or pawl connector to move to (i) a withdrawn position from (ii) a deployed position in which the pawl or pawl connector is extended further from the housing as compared with the withdrawn position;
wherein the at least one gear comprises two cam lobes that are configured to engage two separate cam followers on the rack, such that only one pair of the cam lobe and the cam follower is in contact relative to each other at a time;
wherein interaction between one of the two cam lobes with one of the two cam followers permits the pawl or pawl connector to move toward the deployed position in a controlled manner, and interaction between the other of the two cam lobes with the other of the two cam followers causes the pawl or pawl connector to move toward the withdrawn position; and
wherein the cam followers each comprises an elongated U-shaped curved surface.

20. The electronic latch of claim 19, wherein the cam followers are connected to each other by a shoulder.

21. The electronic latch of claim 19, wherein the cam followers are disposed in a recess formed in the rack.

22. The electronic latch of claim 21, wherein one of the two cam followers is disposed adjacent to the other of the two cam followers at a location further from the rack than the other of the two cam followers.

* * * * *